(No Model.)
J. J. CROOKE.
PROCESS OF EXTRACTING GOLD AND SILVER.
No. 541,658. Patented June 25, 1895.
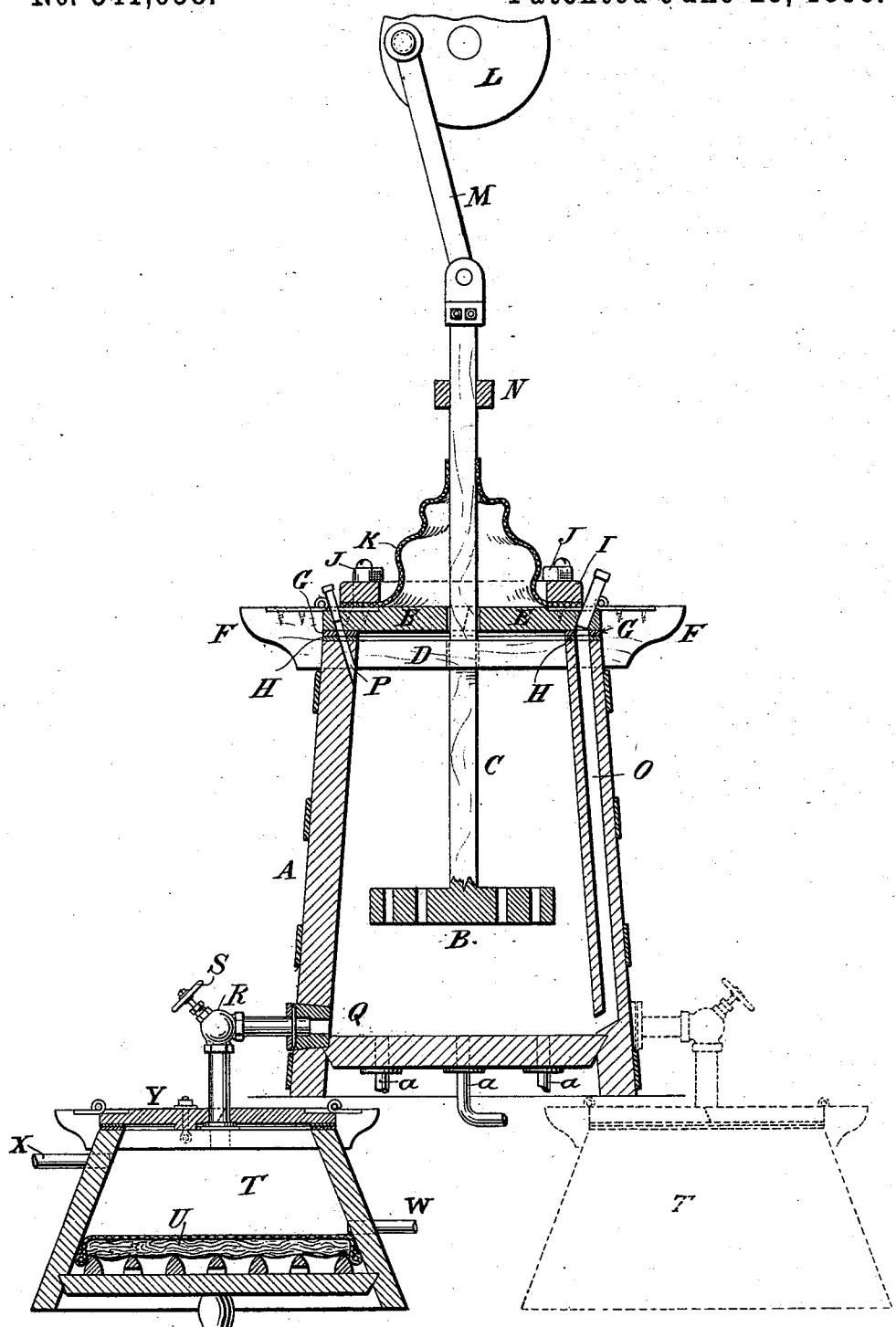
Witnesses:
Raphaël Netter
James N. Catlow
Inventor
John J. Crooke
by Duncan & Page Attys

UNITED STATES PATENT OFFICE.

JOHN J. CROOKE, OF NEW YORK, N. Y.

PROCESS OF EXTRACTING GOLD AND SILVER.

SPECIFICATION forming part of Letters Patent No. 541,658, dated June 25, 1895.

Application filed March 2, 1895. Serial No. 540,293. (No specimens.)

*To all whom it may concern:*

Be it known that I, JOHN J. CROOKE, a citizen of the United States, residing in the city, county, and State of New York, have invented certain new and useful Improvements in Processes of Extracting Gold or Gold and Silver from Their Ores, of which the following is a specification, reference being had to the accompanying drawing, forming a part of the same, which illustrates in vertical section a form of apparatus adapted for use in practicing my improvements.

The present invention relates to the treatment by chlorination of ores carrying gold, or gold and silver, and is especially adapted to that class of ores which are rich in gold although generally associated with a small quantity of silver.

The object of this invention is to make a perfect extraction of the gold and silver, either with or without (in most cases without) having recourse to roasting or calcination, and also to materially reduce the time and cost of extraction.

The invention consists generally in the processes hereinafter more particularly described and claimed.

Chlorine has long been recognized as an efficient agent for the extraction of gold and silver from their ores. It is especially useful in its application to refractory gold ores, in which the presence of sulphides, arsenides, tellurides, and other compounds, prevent the precious metals from readily amalgamating with mercury. The Plattner process, in which the pulverized, roasted and moistened ores are treated in an agitator with chlorine, generated in a separate vessel and introduced into the agitator, has been extensively employed. This process, although an improvement on existing methods, rarely extracts more than from eighty to eighty-six per cent. of the assay value of the ores in gold, and none of the silver. I am also aware that modifications have been made in the Plattner process, by which chlorine has been generated in the body or mass of the ore, by mixing chloride of lime, or chloride of lime and chloride of sodium, with the ore reduced to a flowing pulp by the addition of water, and then introducing sulphuric or hydrochloric acid to generate chlorine, and I am informed that by this modification the percentage of gold extracted has been increased in some cases to ninety per cent. of the assay value of the ores, while the silver, as chloride, has remained in the tailings.

It occurred to me that, as the chlorine in the last named process was liberated in direct contact with the ore, and was thereby available to act in its nascent condition to convert the gold into a soluble chloride, the results should have shown a more perfect extraction of the gold, and I concluded there must be some defect in the process, in that the chlorine was not generated with sufficient force or power, or that the proper effect of the gas was in some way modified or prevented. Accordingly, I have made a careful study, supplemented with many experiments and tests, to discover the proper materials or compounds with which ores carrying gold and silver could be treated to generate chlorine freely and instantly in the mass of the ore so that, while in its nascent condition, it would be in intimate contact with the particles of gold and silver and would act to immediately convert them into chlorides.

As a result of my investigations, I have discovered that a solution of nitrate of copper, preferably of a specific gravity indicating 100° by the ordinary salometer, water being zero, or about 25° Baumé's hydrometer, can be successfully utilized as an oxidizing and chlorine-liberating agent, when mixed with the ores and chloride of sodium and the mass treated with a chlorine-liberating acid. For example, if the mass thus prepared is treated with sulphuric or hydrochloric acid, a rapid and instantaneous liberation of nitric peroxide and chlorine takes place.

Sulphuric acid, when used as above set forth, does not act to liberate chlorine directly, hydrochloric acid being first formed which is immediately decomposed with the liberation of chlorine, but inasmuch as the sulphuric acid causes the reactions by which chlorine is liberated, for the purposes of my invention I will consider sulphuric acid as well as hydrochloric acid as a chlorine liberating acid.

I have also discovered that if a small per cent. of oxide of manganese, preferably the binoxide or peroxide, or of manganic iron (which latter is an ore generally containing a large percentage of binoxide of manganese associated with rock and is abundant in many gold and silver producing localities) be added to the mass to be treated, the efficiency of the solution for the rapid and exhaustive extraction of the gold is materially increased, especially if the ores are raw or only partially roasted. I do not, however, consider that the presence of oxide of manganese as an ingredient of the solution in connection with nitrate of copper and chloride of sodium is essential, but that it simply supplements the action or efficiency of the nitrate of copper.

I have further discovered that the use of a hot, aqueous solution of chloride of sodium, preferably slightly acidulated with hydrochloric acid, as the liquid of the plasma, is of great advantage, especially in the treatment of ores containing silver associated with gold. Based on these discoveries and experiments I have devised, developed and practiced the following method, or process, for chlorinating ores carrying gold, or gold and silver.

The ores to be treated are pulverized, preferably to about forty to fifty mesh, and are preferably roasted or partially roasted. If they contain about one hundred and fifty dollars gold value per ton, they are intimately mixed with about six per cent. of chloride of sodium, and the mass is then charged into a digester of any suitable shape and construction which contains a hot solution composed mainly of water, to which is added as the essential active ingredient about three per cent. of solution of nitrate of copper of the specific gravity above set forth, and preferably about two per cent. of chloride of sodium, the solution being preferably slightly acidulated with hydrochloric acid. The preparation of ores and solution should be so related that, when intimately mingled, they will form a plasma of about the consistency of thin paste. The digester is provided with means for closing it substantially gas tight, and for introducing charges of acid from time to time at or near its bottom, and with means for thoroughly agitating its contents, as hereinafter more fully described. Sulphuric acid is now introduced into the plasma in small charges at frequent intervals of time.

The quantity of acid required is generally from three to six per cent. of the weight of the ore taken for treatment, depending, however, upon the richness of the ore, and consequently the quantity of chlorine required to convert the gold and silver to chlorides. The plasma should be kept under constant agitation during the introduction of the acid in order to evenly distribute the chlorine through the plasma. As chlorine is about twice as heavy as air, its production can be readily controlled by the amount of acid introduced from time to time, so that in a properly constructed digester but little free gas will rise beyond the top of the plasma during the conversion of the gold and silver into chlorides. As the violent reaction brought about by the acid causes an increase of temperature throughout the mass, its introduction should be sufficiently slow to prevent a rise of temperature above 180° Fahrenheit. When charges of six tons are treated, about one hour is consumed in the acid stage, charges of from fifteen to twenty pounds of acid being introduced at intervals of from half to one minute. After the acid has been thoroughly mixed by agitation with the plasma the charge should not be moved, but allowed to remain at rest for about six hours, at a temperature of about 100° Fahrenheit, which is maintained by injecting dry steam into the digester from time to time.

As before stated the operation above described will generally be more efficient to convert the gold into a chloride and facilitate its rapid and exhaustive extraction, if a small per cent. of oxide of manganese is present in the mass during the chlorinating operation.

When manganic iron ore preferably containing about fifty per cent. of binoxide of manganese is used, it is preferred, in order to uniformly distribute the chloride of sodium and manganic iron throughout the ore to be treated, to first make an intimate mixture of about six per cent. of chloride of sodium, as heretofore stated, with about three per cent. of manganic iron to each ton of ore, by grinding or otherwise intimately associating them together, and then thoroughly mix this mass with the ores. The mass thus formed, composed of ores, chloride of sodium and manganic iron, is then charged into the digester containing a hot aqueous solution of the kind heretofore described, whose principal active ingredient is nitrate of copper, and is then treated by agitation and the introduction of repeated charges of acid, all as hereinbefore set forth.

I have found that the nitrate of copper becomes more effective as an active re-agent when a small per cent. of oxide of manganese or of manganic iron is present in the solution, especially when the ores are of a very refractory character and are in a raw or unroasted condition.

Considering now that the mass has been treated in the digester, as heretofore described, till the conversion is complete, the plasma is forced by steam pressure from the digester into the lixiviation tanks, through suitable openings. The leaching tanks are provided with properly constructed filters, through which the solution carrying gold and silver passes. This filtrate is delivered directly into a precipitating tank in which the gold, copper, and silver are precipitated in a metallic condition by contact of the metallic bearing filtrates to surfaces of sheets of soft iron immersed in the precipitating tank. When the precipitation is complete, and by this method it will be exhaustive, the solution deprived of all its valuable constituents is siphoned from the precipitate. The metallic residuum is placed upon a large table filter and washed. It is then conveyed to a suitable vessel and treated with nitric acid. This treatment will dissolve the silver and copper, and leave the gold absolutely pure. The solution of copper and silver is then separated by filtration, and thus produces the nitrate of copper and silver to be used in subsequent operations for the production of chlorine and peroxide of nitrogen. The silver contained in this copper solution when sufficiently enriched by repeated applications of solution in the chlorinating process can be recovered by any of the well known methods.

As my invention relates particularly to the operations directly connected with the chlorinating steps of the process hereinbefore set forth, I will describe a form and general construction of digester and leaching tank which I prefer to use, and which are illustrated in the accompanying drawings, the several parts being shown in section.

In the drawing, A represents the digester, which in practice I make of a capacity for treating about five or six tons of material. It is preferably circular in cross-section and in the form of a truncated cone, and, for the capacity above referred to, should be about six feet in diameter at its bottom and four feet at its top, and about seven feet high. It is is provided with an agitator which consists of a perforated dasher B, fixed to its shaft C, which works in bearings in the cross-piece D, and passes through cover E, the latter being preferably made in two parts each hinged to projections F, on the cross-piece. Packing rings or gaskets G, H, of rubber or other suitable material, form tight joints between the cover and the rim of the digester. A ring I, is clamped tight down upon the cover E by means of the clamping buttons J, which turn upon the screws which secure them to the cover. A flexible cone-shaped hood K, is secured at its lower edge to the under side of the ring I and serves to seal this joint while its upper edge is tightly secured to the shaft C, there being sufficient slack in the material of the hood to permit an upward throw of the shaft of about four feet without straining the hood. This hood can be made of strong canvas soaked in paraffine to make it gas tight.

The agitator may be caused to reciprocate by any desired mechanism, as by a wheel L, and connecting crank rod M, pivotally secured to the top of the shaft.

N is a fixed steadying guide through which the shaft passes.

The digester is further provided with a channel O, extending through the cover E and downwardly through the side wall and communicating with the interior near the bottom of the digester, and is preferably about two and one-half inches in diameter, through which acid and steam can be admitted.

P is a channel communicating with the air, through which any excess of gas can escape and be removed by an attached hose or other means. The digester is also preferably provided with two large discharge pipes Q, and means for opening and tightly closing the same, as a valve R, operated by a hand screw S.

The interior walls of the digester, as well as the dasher and shaft of the agitator, are preferably made of wood and may be soaked or painted with paraffine or other gas and acid proof substance. The digester is provided with steam pipes a, entering its bottom and the desired agitation of the plasma may be effected by the introduction of a jet or jets of steam. Both the dasher B and jets of steam may be employed for this purpose or either one alone. Steam for aiding the rapid discharge of the contents of the digester may be admitted through the orifice P, and hot water to wash out the interior may be admitted through the same or any other convenient channel.

T T are laxiviating tanks located directly beneath the discharge pipes Q of the digester to receive its contents, and are provided with filters U, of any efficient construction. The capacity of each tank should be at least equal to that of the digester.

V is an exit by which the filtrate can be delivered directly into a precipitating tank. Not shown.

W is a sluice way for removing the tailings, which are washed out by water introduced into the tanks under required pressure. I prefer to make these tanks large at their bottom as compared with their top portions in order to give a large filter surface, and to make them, as well as the digester, gas, steam and air tight in order to utilize the pressure of steam or compressed air to force the rich solutions rapidly from the sands and clays with which they are associated, and for this purpose they are provided with one or more pipes X, near their tops. They are also provided with a manhole Y, to obtain access to their interior and through which water can be introduced.

In the working of my process for extracting gold and silver from their ores I use the digester and tanks above described in the following manner: About four hundred gallons of the hot aqueous solution heretofore described, containing about three per cent. of the solution of nitrate of copper, is drawn from a stock tank into the digester. The mass to be treated, containing the pulverized ores, chloride of sodium, and manganic iron if used, mixed in the proportions substantially as set forth, is fed by power conveyers, or otherwise, into the digester through the open cover E, until about six tons have been entered. The cover E is then closed and the hood K secured at its edge, and with the exception of a valvular opening through the top of the tank (to permit the regulation of pressure) the whole apparatus is virtually gas tight. The mass is now agitated by the movement of the dasher B, or jets of steam entered through the lower part of the tank near the bottom, or both, and will, by this treatment, be quickly converted into a homogenous pulp or plasma.

The acid is then introduced at short intervals in charges of from ten to twenty pounds through the channel O, or any other suitable opening in the gas-tight cover of the tank, but preferably so that it will be delivered near the bottom of the digester. Chlorine and nitric peroxide are immediately generated with great freedom and volume, and are quickly and evenly distributed through the plasma by the operation of the steam jets, or any other proper stirring contrivance. The minute volumes of gases being liberated in a nascent condition immediately combine with the metals and change them eventually to chlorides. After the acid has been thoroughly incorporated with the plasma the steam jets are closed, and the contents of the digester is preferably allowed to remain at rest for about six hours. It is then removed from the digester into the lixiviation tank through a suitable orifice in the bottom of the digester. This is rapidly accomplished by steam pressure and warm water entered on the top of the charge. The digester is now ready for re-charging, and the above described operation repeated. The plasma, after being passed into the lixiviation tank, will have a temperature of about 120° Fahrenheit, and is preferably allowed to stand an hour. Hot two per cent. chloride sodium solution, preferably slightly acidulated with hydrochloric acid, to the amount of about four hundred gallons is then entered upon the leaching charge. The launder of the lixiviation tank is lowered and the gold and silver solution, after passing the tank filter, is directly received into a precipitating tank. When most of the solution has passed the filter, the charge remaining in the lixiviating tank should be thoroughly washed with hot water until the filtrate gives no reaction for gold or silver. The gold will be in a state of chloride, the silver as double chloride of silver and sodium, both soluble in the menstruum, the copper as a soluble hydrated cupric chloride. The gold, silver and copper are precipitated from the solution together by exposure to surfaces of soft iron plates, and separated as hereinbefore described.

I have found that by the use of the process and apparatus above described I can extract over ninety-nine per cent. of the assay value of the gold and silver contained in refractory ores.

I ascribe the efficiency of the process largely to the introduction of the nitrate of copper as a powerful oxidizing element, which in my judgment operates with the other elements to cause instantaneous reactions, by which chlorine and peroxide of nitrogen are generated with great power in a nascent condition, and are brought into direct contact with the metals, to effect the conversion of the gold and silver into chlorides even in the presence of sulphur, arsenic and tellurium compounds.

The presence of chloride of sodium in the solution for forming the plasma, causes the chloride of silver to be dissolved as rapidly as formed, and consequently prevents it from forming a coating upon the particles of gold, which would otherwise be the case and would greatly retard the dissolving action and ultimately prevent an exhaustive extraction of either gold or silver. If the solution is slightly acidulated with hydrochloric acid its efficiency for the above purposes is increased.

As before stated, I prefer to use sulphuric acid as the active agent for liberating chlorine in the plasma, inasmuch as this acid forms when in contact with the elements introduced in the ore, nitrohydrochloric acid, nitric peroxide, and chlorine, all efficient agents for freeing the particles of gold and silver from foreign elements, as well as to cause their immediate dissolution.

It has been heretofore stated that the plasma should be subjected to agitation in the digester during the time the chlorine-liberating acid is acting to produce chlorine. This is important to facilitate the operation and to produce the best results. I do not, however, consider it indispensable, inasmuch as, if the plasma remained at rest, the acid would gradually be distributed throughout the mass and operate to generate the chlorine, but the operation would be very much prolonged.

I do not desire to limit my invention to the use of any specific form of construction of apparatus for carrying it into effect, or, to any special means or devices for agitating the plasma during any part of the stage of the chlorination, as it is evident that many forms of apparatus, means and devices may be employed for these purposes, neither do I desire to limit my invention to any specific proportions of chloride of sodium, or oxide of manganese or manganic iron, nitrate of copper and acid to be employed in treating a given quantity of ores, as the quantity of these several ingredients or agents, which should be used to produce the best results, will depend largely upon the character of the ores, their richness in gold and silver, and a variety of other conditions, with which metallurgists are more or less familiar.

I also desire it to be understood that my invention consists essentially in the use of nitrate of copper as an active agent in the treatment of gold and silver ores by chlorination.

What is claimed as new is—

1. The hereinbefore described process of chlorinating gold producing ores, which consists in forming a plasma containing pulverized ores, an alkaline chloride and nitrate of copper, and subjecting the plasma to the action of a chlorine-liberating acid for the purpose set forth.

2. The hereinbefore described process of chlorinating gold producing ores, which consists in forming a plasma containing pulverized ores, an alkaline chloride and nitrate of copper, and subjecting the plasma while the same is under agitation to the action of a chlorine-liberating acid, for the purpose set forth.

3. The hereinbefore described process of chlorinating gold producing ores, which consists in forming a plasma containing pulverized ores, an alkaline chloride, binoxide of manganese and nitrate of copper, and subjecting the same, while under agitation, to the action of a chlorine-liberating acid, for the purpose set forth.

4. The herein described process of chlorinating gold and silver producing ores, which consists in mixing the pulverized ores with an alkaline chloride and binoxide of manganese and then introducing the mass into a hot acidulated solution of nitrate of copper and chloride of sodium, subjecting the plasma so formed to agitation, and introducing a chlorine-liberating acid, for the purpose set forth.

5. The hereinbefore described process of chlorinating gold and silver producing ores, which consists in forming a plasma containing the pulverized ores, an alkaline chloride and nitrate of copper, and then subjecting the plasma to the action of small charges of a chlorine-liberating acid introduced at frequent intervals, for the purpose set forth.

6. The hereinbefore described process of extracting gold from its ores, which consists in forming a plasma containing pulverized ores, an alkaline chloride and nitrate of copper, subjecting the plasma to the action of a chlorine-liberating acid, filtering the plasma, precipitating the gold from the filtrate and recovering the nitrate of copper for reuse in other charges of plasma, substantially as and for the purpose set forth.

7. The hereinbefore described process of extracting gold and silver from their ores, which consists in forming a plasma containing the pulverized ores, an alkaline chloride and nitrate of copper, subjecting the plasma to the action of a chlorine-liberating acid, filtering the plasma, precipitating the gold and silver and copper from the filtrate and recovering the nitrate of copper and silver in solution for reuse in other charges of plasma, and finally separating the silver from the copper solution when sufficiently enriched therewith, for the purpose set forth.

JOHN J. CROOKE.

Witnesses:
RICH. J. BOLLES,
ALTON L. DICKERMAN.